United States Patent [19]

Ponjee

[11] Patent Number: 4,775,554
[45] Date of Patent: Oct. 4, 1988

[54] METHOD OF PROVIDING A MOULD WITH A RELEASE LAYER

[75] Inventor: Johannes J. Ponjee, Eindhoven, Netherlands

[73] Assignee: U.S. Philips Corp., New York, N.Y.

[21] Appl. No.: 27,915

[22] Filed: Mar. 19, 1987

[30] Foreign Application Priority Data

Mar. 28, 1986 [NL] Netherlands ................ 8600809

[51] Int. Cl.$^4$ .............................................. B44D 1/20
[52] U.S. Cl. .................................... 427/133; 427/134; 427/135; 427/214.1; 427/255; 427/294; 427/295; 427/377
[58] Field of Search ................ 427/133, 134, 248.1, 427/255, 135, 377, 294, 295

[56] References Cited

U.S. PATENT DOCUMENTS

| 2,306,222 | 12/1942 | Patnode | 427/255.1 |
| 4,263,350 | 4/1981 | Valimont | 427/353 |
| 4,532,096 | 7/1985 | Bogner et al. | 427/133 |

FOREIGN PATENT DOCUMENTS

| 446002 | 1/1948 | Canada | 427/133 |
| 0167694 | 10/1983 | Japan | 427/133 |

Primary Examiner—Janyce A. Bell
Attorney, Agent, or Firm—Norman N. Spain

[57] ABSTRACT

A method of providing a mould 1 (FIG. 1) with a release layer, in which a hydrophilic, inorganic surface 2, 4 of the mould is treated with a silane compound of the formula $(R)_m-Si-(X)_{4-m}$ under anhydrous conditions.

5 Claims, 1 Drawing Sheet

METHOD OF PROVIDING A MOULD WITH A RELEASE LAYER

BACKGROUND OF THE INVENTION

The invention relates to a method of rendering a hydrophilic, inorganic surface of a mould suitable for the release of synthetic resin products.

Such a method is described in, for example, U.S. Pat. No. 4,251,277. In said Specification the surface of the mould is treated with a polymer composition which contains an organopolysiloxane and a thiofunctional polysiloxane liquid. The polymer composition is a clear liquid whose kinematic viscosity is, for example, of from 75 to 100 cS ($75.10^{-6}$ to $100.10^{-6}$ m²/s). As is shown in the examples of said United States Patent Specification, the release agent is applied in relatively thick layers to a metal substrate, such as a metal board. Preferably, a layer thickness of from 0.125 mm to 2.5 mm is applied. Said United States Patent Specification states in column 7, line 61 and following that very small layer thicknesses of a few Ångstrom units may also be applied. However, this seems to be a misconception. The molecular dimensions of the substances used are much larger than a few Ångstroms. Moreover, the high viscosity is not suitable for obtaining very thin layers. This means that the known solvent can not be used with moulds having a fine surface structure because the structure is masked completely by the rather thick layer of the solvent. The layer also exhibits undesired variations in layer thickness. As with many other known polysiloxane solvents, the use of this known solvent in addition causes the metal surface of the substrate to change into an SiO surface. Such an SiO surface exhibits polarity, to some degree, which causes synthetic resins such as the somewhat polar synthetic resins, for example polyacrylates, polymethacrylates, polycarbonates etc., to exhibit a certain interaction with this surface. It is to be noted that the synthetic resins can be readily released from such a modified surface. However, due to the aforesaid interaction some synthetic resin material will remain in the long run on the surface of the mould. This will cause problems in reproduction processes where very many synthetic resin copies must be made of one mould or where the surface of the mould has a fine structure or texture, or a very smooth surface. The residual synthetic resin material, no matter how little, will veil the texture of the surface of the mould thereby rendering the production of qualitatively good copies impossible. Thus, an early replacement of the mould is necessary.

According to U.S. Pat. No. 4,263,350 the surface of a glass mould is sprinkled, in a humid atmosphere having a water content of at least 55%, with a liquid mixture of dimethyldichlorosilane and trimethylchlorosilane. In the humid atmosphere a dense mist develops in the reaction chamber and an oily film of a polysiloxane is formed, due to hydrolysis of the silane compounds and polymerization of the hydrolized silane compound caused by a condensation reaction. This process and the mould produced exhibit the same disadvantages as the mould and the method of the above-described U.S. Pat. No. 4,251,277. Moreover, the polymerization reaction is an uncontrolled process which leads to local variations in the thickness and composition of the oily film obtained.

BRIEF SUMMARY OF THE INVENTION

It is an object of the invention to provide such a method that the product obtained does not have the above-described disadvantages.

An object in accordance with the invention is to so modify the hydrophilic, inorganic surface of a mould that all types of synthetic resins, including those having a polar character, can readily be released from the modified surface.

A further object is to so modify the hydrophilic, inorganic surface that a fine structure or profile is not changed essentially, and, as a consequence, exact copies can be made.

Yet another object is to provide a method which can be applied to various types of a hydrophilic, inorganic surface.

A further object in accordance with the invention is to provide a simple method of treating the surface, which does not require any labour-intensive pre-treatments or post-treatments.

These objects are accomplished in accordance with the invention by a method of the type described in the opening paragraph, which is characterized in that the hydrophilic, inorganic surface is treated under anhydrous conditions with the silane composition of the formula $$(R)_m—Si—(X)_{4-m} \qquad (1)$$

where
m=1, 2 or 3,
R is a linear or branched alkyl group or alkoxyalkyl group which contains 1–20 carbon atoms and which may be partly substituted with fluorine, and
x is a chlorine atom, a methoxy group, ethoxy group, amino group, which amino group may be substituted with one or two methyl and ethyl groups or an imidazole group, where a monolayer of the silane compound is chemically linked t the hydrophilic, inorganic surface via oxygen bridges.

DETAILED DESCRIPTION OF THE INVENTION

Figure 1:
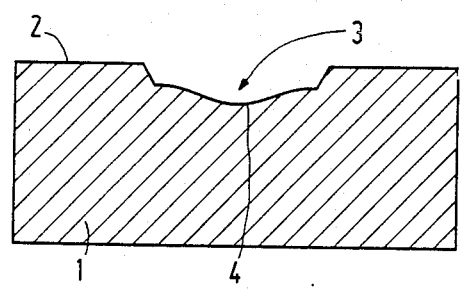
FIG. 1 is a cross sectional view of a mold employed in the method of the drawing and FIG. 2 is a schematic view of an arrangement for carrying out the method of the invention.

The hydrophilic, inorganic surface consists, in particular, of a metal such as Ni, Al, Ag or of glass or quartz. The mould may be made entirely of such a material but it may also be provided with an upper layer of metal, glass or quartz. An example thereof is a synthetic resin mould or a mould which is provided with a synthetic resin protective coating such as a protective coating of a UV-cured acrylate or methacrylate synthetic resin, the synthetic resin or synthetic resin coating being provided with a metal layer or, for example, a layer of $SiO_2$. In the case of a metal layer, such a layer may be provided by an electroless deposition process such as a vacuum deposition process, sputtering process or an electroless chemical process.

This hydrophilic, inorganic surface contains hydroxyl (OH) groups which react with the group(s) X of the silane compound added, thereby forming oxygen bridges and separating out HX. Dependent upon the number of X groups per molecule, per molecule of the silane compound one or more oxygen bridges can be formed with the inorganic surface. Tests have shown that when a silane compound of formula 1 is used, where m=2 and in which the silane compound consequently contains two X groups per molecule, essentially two oxygen bridges are formed with the inorganic surface. Consequently, both X groups react with the hydroxyl groups of the surface. When a silane compound is used which contains 3×groups per molecule, 80 percent of the silane molecules are linked to the inorganic surface via two oxygen bridges.

The R groups of the silane compound bonded to the inorganic surface extend outwardly and shield the entire surface. Consequently, the inorganic surface is changed to an inert surface of alkyl, alkoxyalkyl or fluorine-substituted alkyl or alkoxyalkyl, respectively. The R groups do not contain any reactive components, consequently no more layers can be chemically bonded to the layer of the surface-bonded silane compound. The layer bonded to the inorganic, hydrophilic surface of the silane compound is a monolayer having a very small thickness. A few more molecular layers may be physically bonded to the first molecular layer which is chemically bonded to the surface. Due to the very small thickness, the structure of the inorganic surface remains substantially unchanged. Consequently, by means of the mould manufactured in accordance with the invention very accurate replicas can be produced. Emphasis is put on the fact that the method in accordance with the invention must be carried out anhydrously, i.e. in a dry condition. The presence of moisture will lead to a hydrolyzation of the silane compound, thereby forming silanol groups which polymerize due to a condensation reaction. Consequently, a layer is obtained having an irregular thickness and a variable composition, which should be avoided.

In an advantageous embodiment of the method in accordance with the invention, the hydrophilic, inorganic surface is treated with the vapour of the silane compound at a reduced pressure. This vapour-phase process is an elegant process which can be carried out under strictly anhydrous conditions. Preferably, it is carried out at a raised temperature.

In a further suitable embodiment of the method in accordance with the invention, the hydrophilic, inorganic surface is treated with a solution of the silane compound in an anhydrous, organic solvent. An example of a suitable solvent is dry toluene.

A further advantageous embodiment of the method in accordance with the invention is characterized in that the hydrophilic, inorganic surface is treated with a silane compound of formula 1, where R is a fluoroalkyl group, branched or not, a fluoroalkoxy-alkyl group, branched or not, or an alkyl group, branched or not, having at least 10 carbon atoms.

Preferably, the hydrophilic, inorganic surface is treated with (heptadecafluorine 1,1,2,2-tetrahydrodecyl)-1-triethoxysilane, (heptadecafluorine 1,1,2,2-tetrahydrodecyl)-1-trichlorosilane, (heptadecafluorine 1,1,2,2-tetrahydrodecyl)-1-dimethylchlorosilane or with n-octadecyltrichlorosilane.

Examples of suitable silane compounds which may be applied in the method in accordance with the invention, are represented by the following formulae:

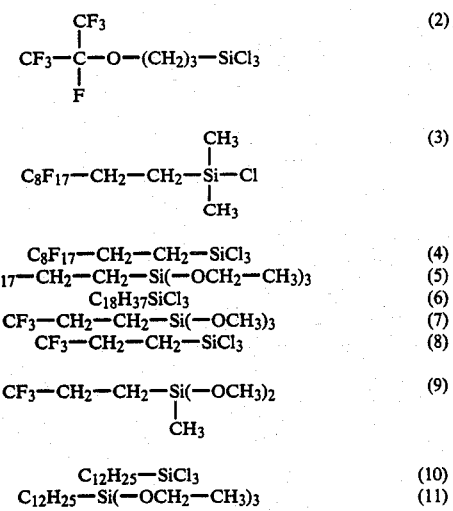

The mould manufactured by the method in accordance with the invention may be used, for example, for the manufacture of synthetic resin optical components (lenses, mirrors) or optical components which are provided with a synthetic resin coating layer. The mould is made of, for example, Al, stainless steel, quartz or a synthetic resin which is provided with a layer of $SiO_2$. A monolayer of the silane compound is applied in accordance with the inventive method to the inorganic, hydrophilic surface of the mould which during operation contacts the synthetic resin of the replica to be made. A further example is an Ni mould, the surface of which is modified in accordance with the process of the invention and which is used for the production of projection television screens.

The invention will now be explained in more detail by means of the following exemplary embodiment and with reference to the drawing.

Reference numeral 1 in FIG. 1 denotes a mould which is made of Al. The mould 1 may also be made of another metal such as stainless steel or Ni, or of glass or quartz. It is also possible that mould 1 is made of a synthetic resin such as polycarbonate, epoxy synthetic resin or polymethyl methacrylate and that the upper surface is coated with a layer of $SiO_2$ which is applied by vacuum deposition. The mould shown in the figure is designed for producing optical components, in particular lenses. At the upper surface 2 the mould is provided with a cavity 3 having an accurately polished aspherical surface 4.

Figure 2:
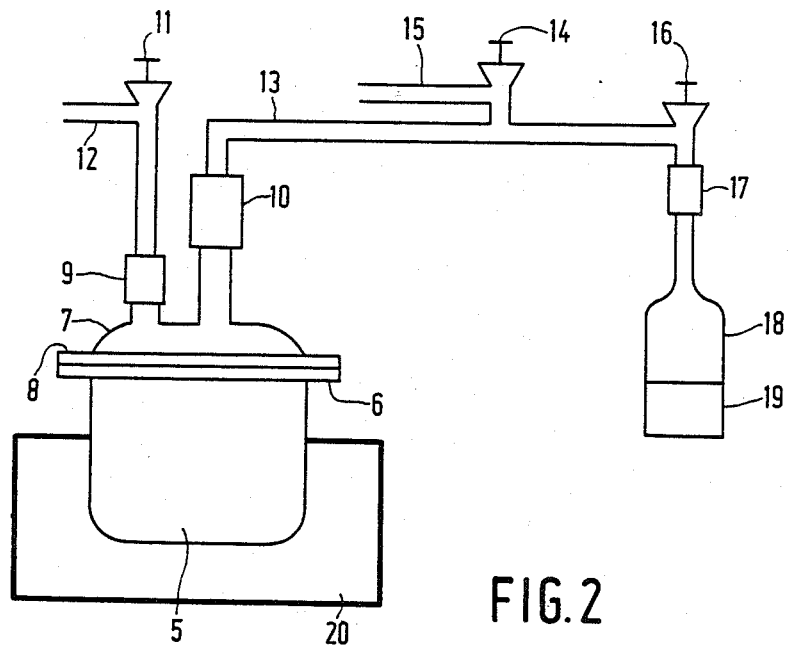

The upper surface 2 of mould 1 is purified by UV radiation in an ozone atmosphere for a few minutes. Said surface is hydrophilic and contains hydroxyl groups. Subsequently, the mould is positioned in a reaction vessel 5 (FIG. 2). This reaction vessel is provided with a flange 6. The vessel is closed by a cover 7 which is also provided with a flange 8. By means of a rubber ring (not shown) which is positioned between the flange portions 6 and 8, a vacuumtight sealing is obtained. The cover 7 is provided with two connections 9 and 10. Via a conduit 12 which is provided with a stop cock 11, the connection 9 is connected in a vacuumtight manner to a vacuum pump which is not shown. Connection 10 is connected in a vacuumtight manner to a conduit 13. Said conduit 13 is connected via a tap 14 to a supply pipe 15 for an inert gas, such as $N_2$. Via a tap 16 the conduit 13 is furthermore connected to a connection 17 of a tank 18 which is provided with a quantity 19 of a silane compound which corresponds to one of the formulas (2)-(11), shown previously in this specification in particular a quantity of the substance (heptadecafluorine 1,1,2,2-tetrahydrodecyl)-1-triethoxysilane in accordance with the above given formula 5. After the mould 1 is introduced in the reaction vessel 5, said vessel is heated to a temperature of 150° by means of a heating body 20. Taps 14 and 16 are closed. Tap 11 is opened and the assembly is evacuated via the conduit 12. Next, tap 16 is opened such that silane vapour from tank 18 is supplied to the reaction vessel 5 where it reacts with the hydrophilic surface of mould 1, a chemically bonded monolayer of the silane compound being formed as previously described. Subsequently, tap 16 is closed, the vacuum pump is disconnected and the silane vapour still present in the reaction vessel 5 is removed by flushing the vessel with an inert gas via conduit 15 and tap 14. Now, the mould obtained is suitable for the production of synthetic resin copies or copies which are provided with a protective coating of a synthetic resin. This copies (replicas) can readily be released from the modified mould surface 2,4.

What is claimed is:

1. A method of rendering a hydrophilic, inorganic surface of a mould suitable for the release of synthetic resin products, characterized in that the surface is treated under anhydrous conditions with a silane compound of the formula $$(R)_m\text{—Si—}(X)_{4-m} \qquad (1)$$

where
   m=1, 2 or 3,
   R is a linear or branched alkyl group or alkoxyalkyl-group which contains 1-20 carbon atoms and which may be partly substituted with fluorine, and
   X is a chlorine atom, a methoxy group, ethoxy group, amino group, which amino group may be substituted with one or two methyl or ethyl groups or an imidazole group,
where a monolayer of the silane compound is chemically linked to the hydrophilic, inorganic surface via oxygen bridges.

2. A method as claimed in claim 1, characterized in that the hydrophilic, inorganic surface is treated with the vapour of the silane compound at a reduced pressure.

3. A method as claimed in claim 1, characterized in that the hydrophilic, inorganic surface is treated with a solution of the silane compound in an anhydrous organic solvent.

4. A method as claimed in claim 1, characterized in that the hydrophilic, inorganic surface is treated with a silane compound of formula 1, where R is a branched or unbranched fluoroalkyl group or fluoroalkoxy-alkyl group or a branched or unbranched alkyl group having at least 10 carbon atoms.

5. A method as claimed in claim 4, characterized in that the hydrophilic, inorganic surface is treated with (heptadecafluorine 1,1,2,2-tetrahydrodecyl)-1-triethoxy silane, (heptadecafluorine 1,1,2,2-tetrahydrodecyl)-1-trichloro silane, (heptadecafluorine 1,1,2,2-tetrahydrodecyl)-1-dimethylchlorosilane or with n-octadecyltrichlorosilane.

* * * * *